(12) United States Patent
Hart

(10) Patent No.: US 9,233,636 B2
(45) Date of Patent: Jan. 12, 2016

(54) TIE-DOWN SYSTEM

(71) Applicant: ALLTRADE TOOLS LLC, Long Beach, CA (US)

(72) Inventor: Don Hart, San Clemente, CA (US)

(73) Assignee: ALLTRADE TOOLS LLC, Long Beach, CA (US)

( * ) Notice: Subject to any disclaimer, the term of this patent is extended or adjusted under 35 U.S.C. 154(b) by 144 days.

(21) Appl. No.: 14/174,734

(22) Filed: Feb. 6, 2014

(65) Prior Publication Data

US 2015/0217674 A1 Aug. 6, 2015

(51) Int. Cl.
*B60P 7/08* (2006.01)
*A44B 13/00* (2006.01)

(52) U.S. Cl.
CPC ............ *B60P 7/0823* (2013.01); *Y10T 24/2175* (2015.01); *Y10T 24/318* (2015.01); *Y10T 24/4755* (2015.01); *Y10T 24/4773* (2015.01)

(58) Field of Classification Search
CPC . B60P 7/0823; Y10T 24/318; Y10T 24/2175; Y10T 24/4755; Y10T 24/4773; A61G 3/0808
USPC ................ 24/68 CD, 302, 265 H, 265 CD
See application file for complete search history.

(56) References Cited

U.S. PATENT DOCUMENTS

| | | | | |
|---|---|---|---|---|
| 3,126,228 | A | * | 3/1964 | Greene et al. ........... B60R 22/18 24/165 |
| 3,128,520 | A | * | 4/1964 | Carter ..................... B60R 22/30 24/265 H |
| 2009/0000211 | A1 | * | 1/2009 | Lozier ....................... E04H 9/14 52/23 |

FOREIGN PATENT DOCUMENTS

GB  1498655 A  *  1/1978  ............ B60P 7/0823

* cited by examiner

*Primary Examiner* — Robert J Sandy
*Assistant Examiner* — Louis Mercado
(74) *Attorney, Agent, or Firm* — Fulwider Patton LLP

(57) ABSTRACT

A tie-down strap is described, having a length of fabric having a distal end and a proximal end, wherein a loop is securely formed at the distal end. A first hook having a first eye, is provided, wherein the loop passes through the first eye. A second hook, having a different configuration from the first hook is provided, having a second eye wherein the loop passes through the second eye. The second hook is sized and configured to pass through the first eye of the first hook.

12 Claims, 4 Drawing Sheets

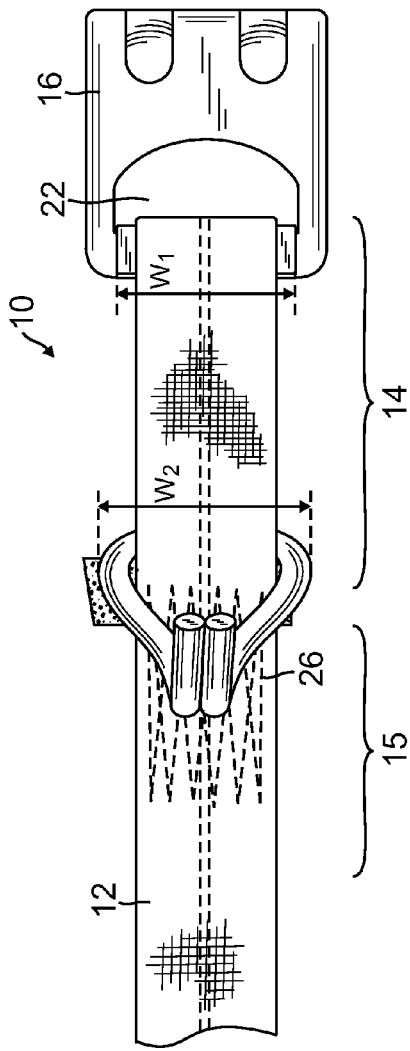
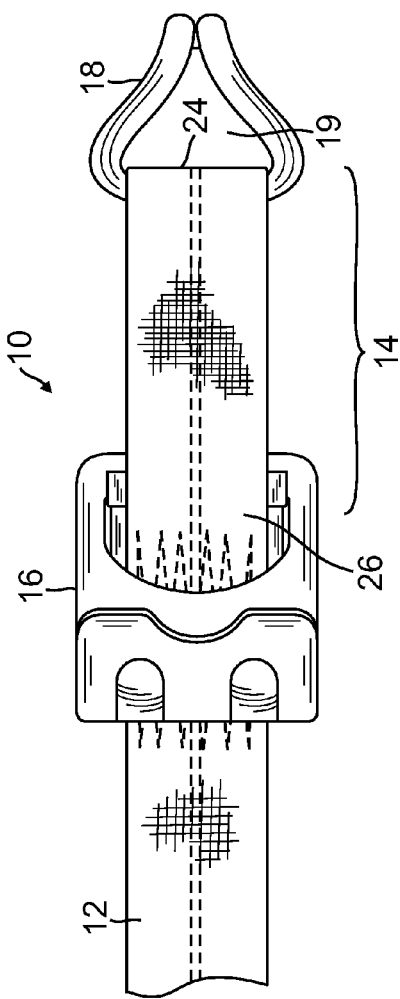
FIG. 2
FIG. 3

TIE-DOWN SYSTEM

BACKGROUND

This application relates to the field of ropes and straps for tying down equipment, whether to secure the equipment or cargo in a stationary condition, or for purposes of moving it.

When moving cargo, movers often use tie-down straps to secure cargo from moving around during transportation. Tie-down straps are today typically made of a heavy duty webbing, which is made from a spun polymer thread. In some cases, a cinching device, such as a ratchet, may also be combined with a tie-down strap to help secure the cargo. Each end of the tie-down strap may terminate with a hook, such as an S hooks, a J hook, a double J hook, a flat hook, a grab hook, or other fastening mechanism. Because the straps and the hooks are made for heavy loads, the hooks are usually permanently attached to the straps to provide the most reliable connection. Depending on the cargo and available hook points, movers may select tie-down straps with a hook that is suitable for the purpose at hand. For example, a mover may select a strap with a wide flat hook when only a thin planar edge is available for supporting the hook; alternatively, the mover may select a strap with a strong double J hook when only a narrow hole is available for supporting the hook; further alternatively, the mover may use an S hook when only a bar is available, and so on.

However, because hooks are typically permanently fixed to straps, movers may be required to own and carry separate straps which are fitted with each type of hook. This may tend to be duplicative, inefficient, and expensive. For example, if a mover requires five hooks to secure cargo, but does not know in advance which type of hook will eventually be required, he may, for example, need to carry a total of fifteen straps, just to cover the possibility that five of only one kind is required, where the possible choices were basic S, J, or flat hooks.

Thus there is a need for straps that solve the problems in the art. The present invention addresses these, and other problems.

SUMMARY OF THE INVENTION

In one embodiment, the invention is a tie-down strap, comprising a length of fabric having a distal end and a proximal end, wherein a loop is securely formed at the distal end. A first hook having a first eye is provided, wherein the first hook is attached to the loop through the first eye. A second hook, having a different configuration from the first hook and having a second eye is provided, wherein the second hook is attached to the loop through the second eye. The second hook is sized and configured to pass through the first eye of the first hook.

In some embodiments, the length of fabric is formed from polyester webbing. In some embodiments, the loop is securely formed at a portion of the fabric that overlaps, by structure that includes stitches. In some embodiments, the invention further comprises a hitch configured to secure the first hook, alternatively the second hook, against movement along the loop. Preferably, the hitch comprises a hook and loop type fastener. In some embodiments of the invention, the first hook is a flat hook, and the second hook is a double J hook. In yet further embodiments, the tie-down strap further comprises a third hook having a different configuration from both the first hook and the second hook and having a third eye wherein the third hook is attached to the loop through the third eye, and wherein the second hook is sized and configured to pass through the third eye of the third hook.

In another aspect, the invention is a method of tying down a cargo. In some embodiments, the invention comprises providing a length of fabric having a distal end and a proximal end and with a loop that is securely formed at the distal end. A first hook having a first eye is provided and attached to the loop. A second hook having a different configuration from the first hook is provided, the second hook having a second eye and being attached to the loop. The first hook is secured to a first attachment point that is compatible to support the first hook. Thereafter, the first hook is removed from the first attachment point. The second hook is slid along the loop, and is passed through the first eye of the first hook. The second hook is attached to a second attachment point compatible to support the second hook. In some embodiments, the invention further includes preventing the second hook from sliding along the loop while the first hook is secured to the first attachment point, preferably with a hook-and-loop type fastener. In yet further embodiments, the invention further includes preventing the first hook from sliding along the loop while the second hook is secured to the second attachment point, preferably with a hook-and-loop type fastener.

These and other advantages will become apparent when read in conjunction with the drawings and the detailed description of embodiments.

BRIEF DESCRIPTION OF THE DRAWINGS

FIG. 2 is a plan view of the strap portion exemplified in FIG. 1, shown in a second condition.

FIG. 3 is a plan view of the strap portion exemplified in FIG. 1, shown in a third condition.

DETAILED DESCRIPTION OF EMBODIMENTS

As will be described hereinafter in greater detail, the various embodiments of the present invention relates to a multi hook tie-down strap. For purposes of explanation, specific nomenclature is set forth to provide a thorough understanding of the present invention. Description of specific embodiments are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles disclosed herein.

Figure 1:
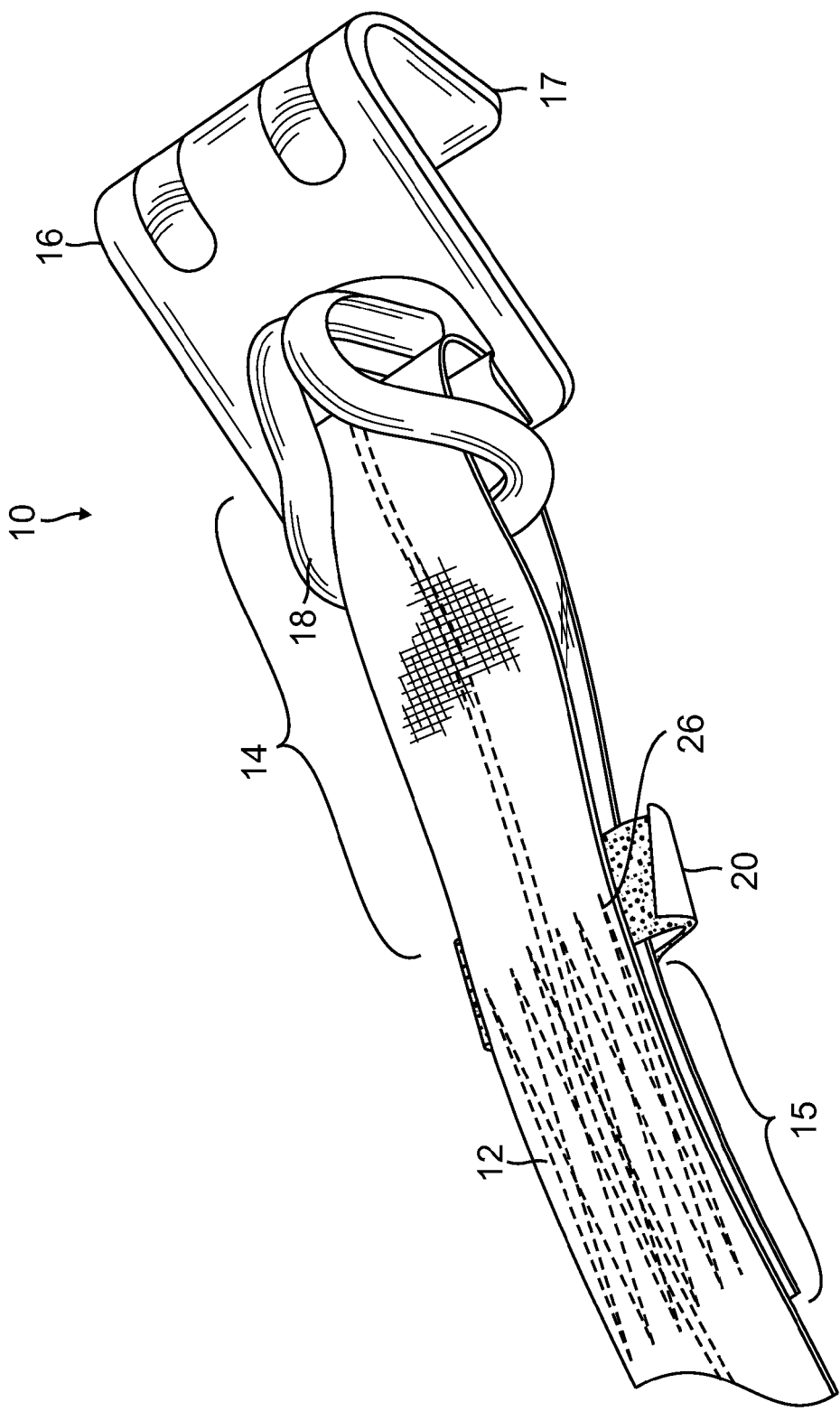
FIG. 1 is a perspective view portion of a strap having features of the present invention, showing hooks in a first condition.

FIG. 1 illustrates distal portion of tie-down strap 10 according to an embodiment of the invention. Strap 10 may include a length of webbing 12, although other material such as rope or hessian may be used. Where the term webbing is used herein, it shall be construed to encompass polyester fiber, rope, hessian fiber, and all other types of fiber commonly used for manufacturing straps. At an end of the webbing, the webbing is looped back on itself for a certain length to form a loop 14 (FIGS. 2, 3) and the terminal end of the webbing is securely connected onto an overlapping portion of webbing, preferably by stitching 15, as seen in FIG. 2. This structure creates a loop 14 at a distal end of the webbing, the loop preferably having a length in the region of from about four to ten inches.

Two hooks, each of a different type, are configured to be attached to the loop. Each hook as an eye, and the webbing is threaded through the eye of each hook before the stitching 15 is applied. The result is a terminal end of a length of webbing, the webbing formed into a terminal loop 14 and two hooks of different type are attached to the loop, as seen in the Figures.

In the embodiment exemplified in the figures, a first hook 16 is attached to the loop 14. The first hook 16 may be configured for being hooked onto a flat plate, and to this end the first hook may itself be formed from a flat plate of metal, wherein the flat plate of metal is stamped out of a parent sheet of metal, after which the stamping is bent into a hooked shape as exemplified in the figures. Prior to being bent, however, a first eye 22 is cut from the stamping, preferably also by a stamping process. Thus, the first hook has a tip 17 that is generally elongate and thin, suitable for hooking onto an edge of a flat plate, and also suitable for being passed through a thin crack should the need arise. The shape and size of the first eye 22 will be described in more detail below.

In the embodiment exemplified in the figures, a second hook 18 of a different kind than the first hook is attached to the loop 14. The second hook 18 may be configured to have a tip that is shaped for being hooked into a small hole. To this end, the second hook may be inexpensively made by bending a steel rod into the shape of a hook, having a second eye 19, commonly known as a "double J" hook.

A significant structural feature of the two hooks 16, 18 in relation to each other is that the first eye 22 in the first hook 16 is sized to permit the whole of the second hook 18 to pass through the eye 22. To this end, as seen in FIG. 2, the width W2 of the second hook is configured to be similar in magnitude to the width W1 of the first eye 22. One of ordinary skill will understand that it is not necessary for width W2 to be smaller than width W1 in order for the second hook 18 to pass through the first eye 22 of the first hook 16. If the second hook is turned at an angle to the first hook, the second hook may be passed obliquely through the eye 22. Likewise, it is not necessary for the length of the second hook 18 to be shorter than the length of the eye 22 of the first hook in order for the second hook to be passed through the eye 22. If the second hook is obliquely threaded through the eye, its length may exceed the length of the eye 22 and still be capable of passing through the eye 22. One of ordinary skill will rapidly identify relative dimensions of the second hook 18 and the first eye 22 that will allow the second hook 18 to be passed through the eye first 22.

Figure 4:
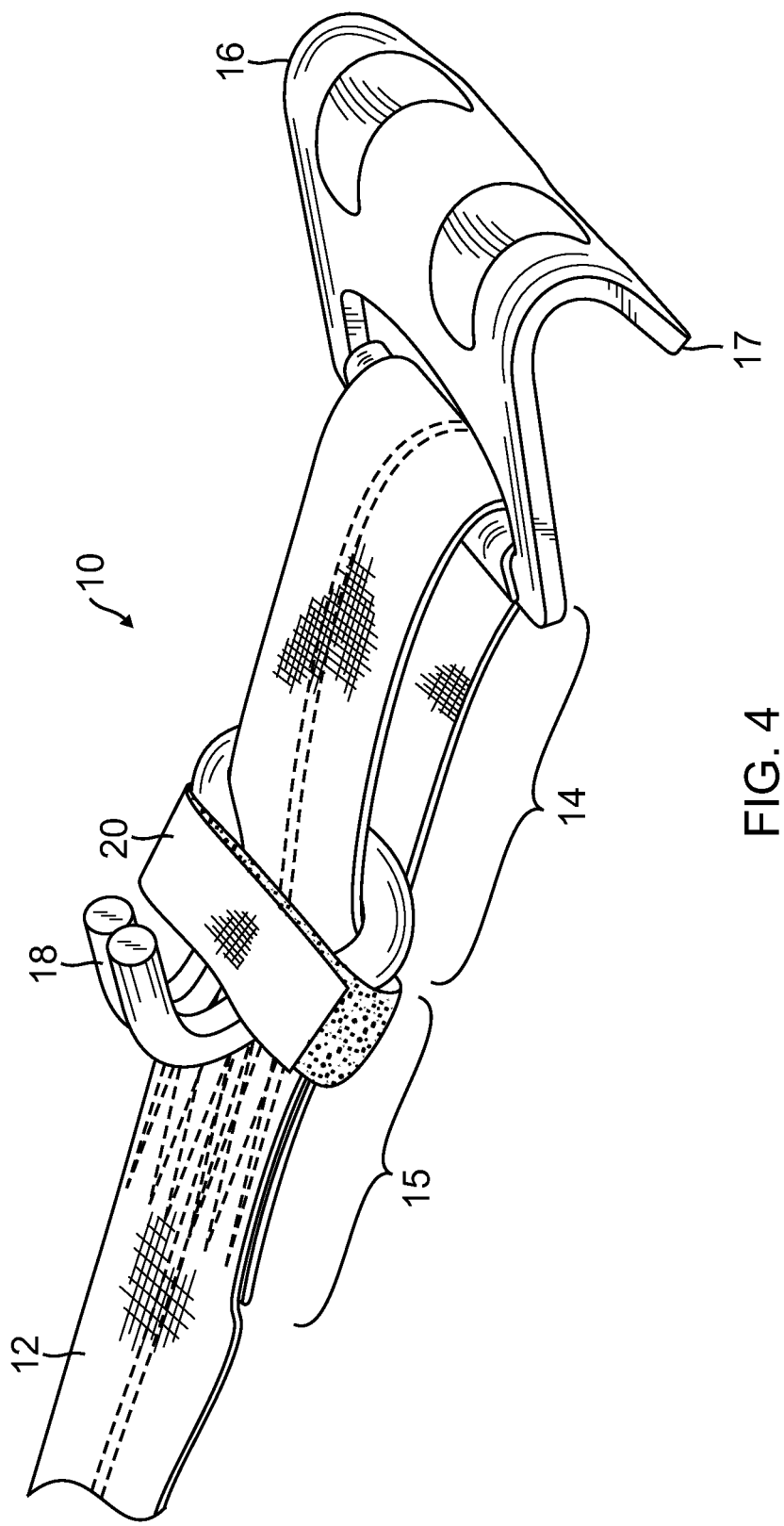
FIG. 4 is a perspective view of the strap portion exemplified in FIG. 2, also in a second condition.

In use of the embodiment described, a user may start with the first hook 16 moved to the distal end 24 of the webbing loop 14. Under this condition, the second hook 18 may be moved to a proximal end 26 of the loop, where it will not play any part in a hooking operation. In some embodiments, a hitch 20 may be inserted into the stitched portion 15, allowing a user to fold the hitch around the second hook 18 to ensure that the second hook does not move or rattle around during operations, as seen in FIGS. 2 and 4. The hitch 20 may comprise a strap of hook-and-loop type fastener (such as Velcro®), or it may comprise an elastic band, a tie string, a hook of fabric, a ring, or the like. In this condition, the user may use the first hook 16 to snag onto a point of purchase that is more suited to the shape of the first hook, such as a flat sheet of metal, which may additionally be positioned close to another object thereby presenting only a thin crack into which the tip 17 of the first hook may be inserted.

Figure 5:
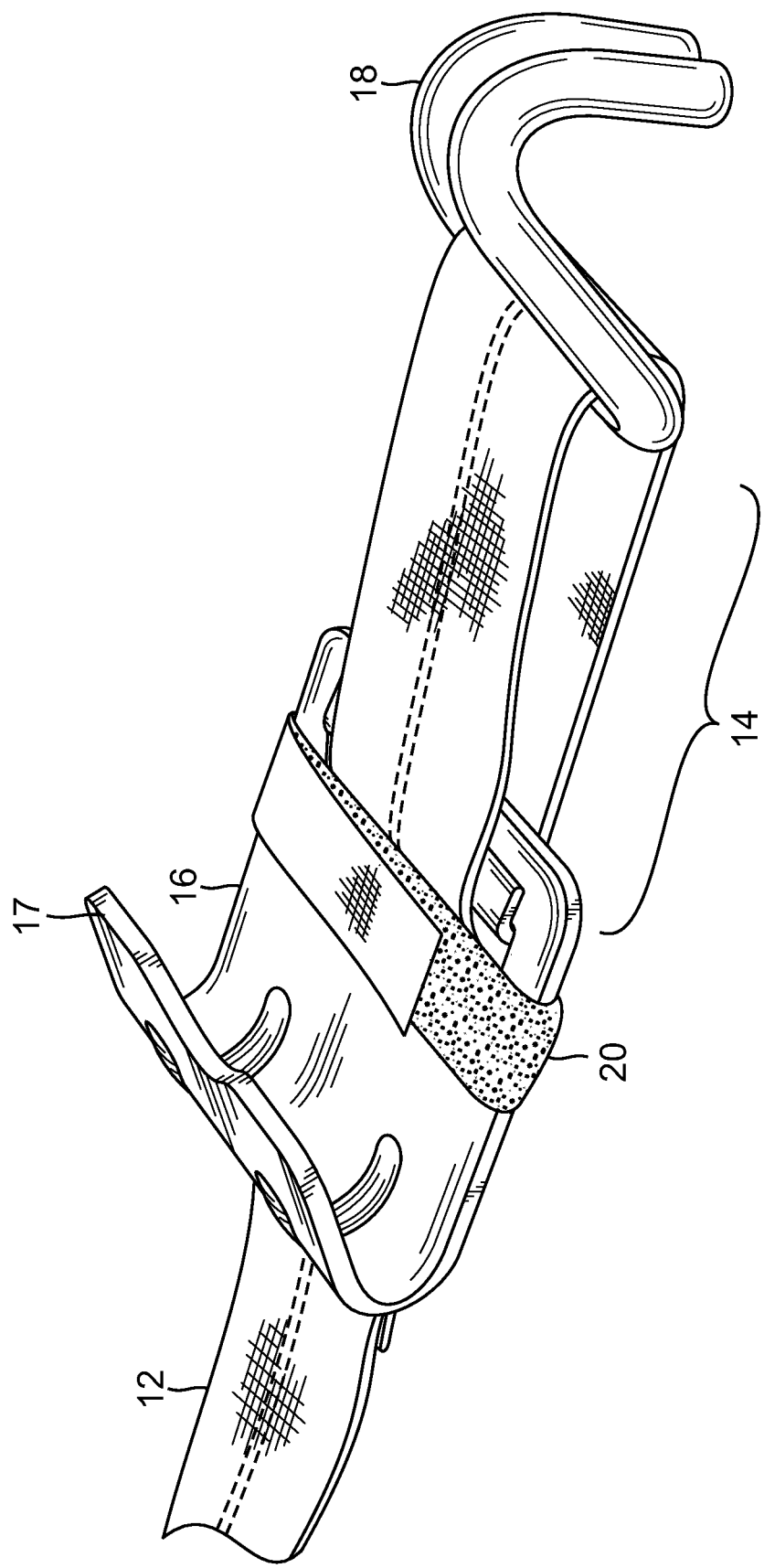
FIG. 5 is a perspective view of the strap portion exemplified in FIG. 3, also in a third condition.

Having thus used the strap 10 in the manner described, the user may later discover that he must reposition the strap to hook onto a point of purchase that is not suitable for the shape of the first hook 16. For example, the user may find that he needs to reposition the strap to hook onto a point that presents only a small hole, a few millimeters in diameter. To this end, he may find that the shape of the second hook 18 would be appropriate. Therefore, without removing the proximal end of the strap (not seen in the figures, but at an opposite terminal end from end 24) from its present location, he may remove the first hook 16 from its point of attachment; then, after removing the hitch 20 from its grip of the second hook 18, he may move the second hook up toward the first hook as seen in FIG. 1. By angling the second hook appropriately in relation to the first eye 22 of the first hook, the user passes the second hook through the eye 22, and then moves the first hook proximally to the proximal end 26 of the loop 14. Where a hitch 20 is present, he may secure the hitch around the first hook, leaving the second hook at the distal end 24 of the loop 14, and ready for engagement with a new connection point, as seen in FIG. 5.

At a later stage, the user may discover that yet a further reconnection of the strap 10 is required, in which the first hook 16 is more suitable than the second hook 18. The user may apply the same steps as above, but in reverse. The first hook is released from the hitch 20 and is moved distally toward the second hook 18. The first hook 16 is passed over the second hook 18, with the second hook moving (relatively speaking) proximally through the first eye 22 of the first hook 16. This action may be envisaged by reference to FIG. 1, which may be seen as exemplifying this action at the moment just after the first hook is passed over the second hook and the second hook has been moved a short distance proximally towards the proximal end 24 of the loop 14. Once complete, the second hook may be secured at the proximal end of the loop using the hitch 20.

It will be appreciated that by following the same principles set forth above, a third hook (not shown in the figures) may be added to the loop. The third hook may be sized and configured to pass through the second eye 19 of the second hook. It will be immediately realized that, under this configuration, the third hook will also pass through the first eye 22 of the first hook. Thus, the user may have a selection of three different types of hook to choose from.

Thus, the various embodiments of the invention provides an advantageous structure for easily and conveniently exchanging one hook for another on a single tie-down strap. The strap may be tightened using a winch (not shown in the figures) or similar mechanism. It will be appreciated that only the distal portion of the strap is shown in the figures, but that the proximal portion (not shown in the figures) may follow any known configuration in the tie-down art. The present invention may, of course, be carried out in other specific ways than those herein set forth without departing from the essential characteristics of the invention. For example, the kinds of hook used may be altered to include an S hook, a J hook or any other kind of hook. The present embodiments are, therefore, to be considered in all respects as illustrative and not restrictive, while the scope of the invention is set forth in the claims that follow.

I claim:

1. A tie-down strap comprising:
   a length of fabric having a distal end and a proximal end, wherein a loop is securely formed at the distal end;
   a first hook having a first eye, wherein the first hook is attached to the loop through the first eye;
   a second hook, having a different configuration from the first hook and having a second eye, wherein the second hook is attached to the loop through the second eye; and further wherein, the second hook is sized and configured to pass through the first eye of the first hook.

2. The tie-down strap of claim 1, wherein the length of fabric is formed from polyester webbing.

3. The tie-down strap of claim 1, wherein the loop is securely formed, at a location where a first portion of the fabric that overlaps with a second portion of fabric, by structure that includes stitches.

4. The tie-down strap of claim 1, further comprising a hitch configured to secure the first hook, alternatively the second hook, against movement along the loop.

5. The tie-down strap of claim 4, wherein the hitch comprises a hook-and-loop type fastener.

6. The tie-down strap of claim 1, wherein the first hook is a flat hook.

7. The tie-down strap of claim 1, wherein the second hook is a double J hook.

8. A method of tying down a cargo comprising:
providing a length of fabric having a distal end and a proximal end and with a loop that is securely formed at the distal end, a first hook having a first eye and being attached to the loop, and a second hook having a different configuration from the first hook, the second hook having a second eye and being attached to the loop;
securing the first hook to a first attachment point that is compatible to support the first hook;
thereafter, removing the first hook from the first attachment point;
sliding the second hook along the loop;
passing the second hook through the first eye of the first hook; and
attaching the second hook to a second attachment point compatible to support the second hook.

9. The method of claim 8, further including preventing the second hook from sliding along the loop while the first hook is secured to the first attachment point.

10. The method of claim 9, wherein preventing the second hook from sliding includes securing the second hook with a hook-and-loop type fastener.

11. The method of claim 8, further including preventing the first hook from sliding along the loop while the second hook is secured to the second attachment point.

12. The method of claim 11, wherein preventing the first hook from sliding includes securing the first hook with a hook-and-loop type fastener.

\* \* \* \* \*